March 1, 1966  R. J. CARTIER  3,237,464
STEPPING MECHANISMS
Filed Feb. 4, 1964

INVENTOR
ROGER J. CARTIER
BY
*Bayard H. Michael*
ATTORNEY

United States Patent Office 3,237,464
Patented Mar. 1, 1966

3,237,464
STEPPING MECHANISMS
Roger John Cartier, Vimercate, (Milan), Italy, assignor to Controls Company of America, Melrose Park, Ill., a corporation of Delaware
Filed Feb. 4, 1964, Ser. No. 342,469
Claims priority, application France, Feb. 13, 1963, 924,672
5 Claims. (Cl. 74—125)

The present invention relates to steping mechanisms, and particularly but not exclusively to programmed time switches, such as washing machine timers.

Such a stepping mechanism can comprise a ratchet wheel which is engaged by an actuating pawl, the pawl being movable slowly backwards to ride over a tooth of the ratchet wheel, during which operation potential energy is stored in a spring, the release of this energy being effective to drive the pawl quickly forward and thereby advance the ratchet wheel through a distance corresponding to the forward distance moved by the pawl. However the kinetic energy imparted to the ratchet wheel during this quick advance is liable to result in overtravel of the ratchet wheel.

According to the present invention there is provided a stepping mechanism comprising a stepped cam rotable in a continuous manner, a stepping lever arranged to be reciprocated in response to the movement of a cam follower over the profile of the cam, a ratchet wheel, an actuating pawl biased into engagement with said ratchet wheel and movable in a rearward direction to ride over a tooth of the ratchet wheel and in a forward direction to drive the ratchet wheel forward, the pawl being connected to the lever to be reciprocated thereby, a locking pawl biased into engagement with the ratchet wheel to hold the ratchet wheel stationary during the rearward movement of the actuating pawl and to prevent overtravel of the ratchet wheel at the end of its forward step, and means for increasing the bias on said locking pawl at the end of said forward step.

The present invention also provides a stepping mechanism comprising a cam movable in a continuous manner and having a slow-rise fast drop profile, a stepping lever of which one arm supports a cam follower in engagement with the cam, and the other arm pivotally supports an actuating pawl, a ratchet wheel engaged by the pawl, the pawl being movable slowly rearwards to ride over a tooth of the ratchet wheel in response to movement of the lever as the cam follower rides on the slow-rise portion of the cam and being movable quickly forwards to advance the ratchet wheel in response to reverse movement of the stepping lever after the cam follower has passed the highest point of the cam profile, a locking pawl spring-biased into engagement with the ratchet wheel, a locking lever on one arm of which the locking pawl is supported, the other arm of the locking lever being disposed in the path of said reverse movement of the stepping lever to limit said reverse movement and to receive an impact from said stepping lever which assists in preventing overtravel of the ratchet wheel at the end of a step of its movement.

These and other features of the invention will now be particularly described with reference to one embodiment of stepping mechanism which is given by way of example and shown in the accompanying drawing in which:

FIGURE 1 is an elevational view of the stepping mechanism showing a ratchet wheel journalled in a plate, the parts of the ratchet mechanism disposed on the front side of the plate or seen through windows in the plate being shown in full line whilst the other parts of the mechanism behind the plate are shown in ghost lines. In this view, a pawl for moving the ratchet wheel is shown fully inserted in the space between two teeth, as at the end of a step of movement.

Figure 1:
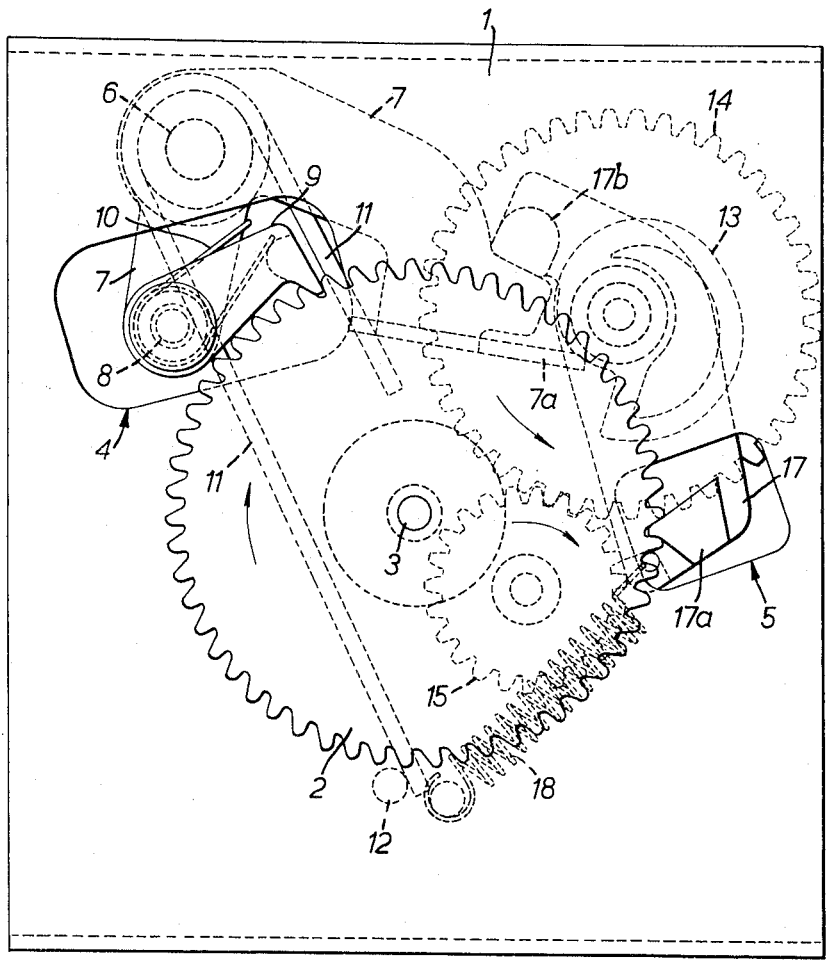
Figure 2:
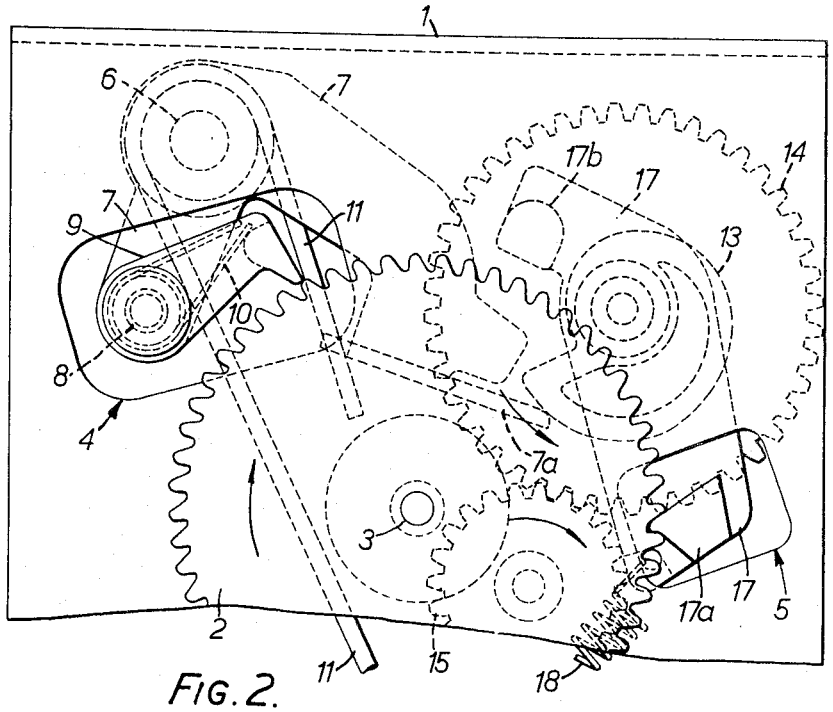
FIGURE 2 is a partial view, similar to that of FIGURE 1, showing the pawl riding over one of the teeth of the ratchet wheel in preparation for moving the gear wheel through a step of movement.

As shown in the drawing, the mechanism comprises a supporting plate 1 in front of which is a ratchet wheel 2 mounted on an axle 3, which is journalled in the plate 1. This plate has two windows 4 and 5 the purpose of which will appear below.

Behind the plate is a bell crank lever 7 journalled on an axle 6 in the plate 1. The shorter arm of the lever 7 which is visible through the window 4 supports an actuating pawl 9 which is pivoted on an axle 8 on the arm and is biased by a spring 10 in a direction to hold it in engagement with the teeth of the ratchet wheel 2. The axle 8 extends through the window 4 and supports the pawl 9 on the front side of the plate 1.

Figure 3:
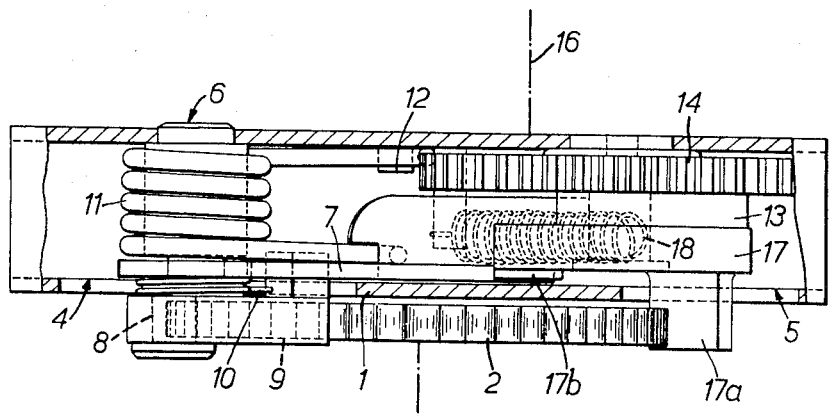
FIGURE 3 is a plan view with certain parts removed, of the mechanism of FIGURE 1.

An accumulator spring 11, a part of which is wrapped around the axle 6, has two straight arms, the longer of which engages at its end with a fixed abutment 12 on the plate 1 while the other shorter arm bears against the longer arm of the lever 7 to maintain a cam follower 7a on this lever in contact with a rotary cam 13 having a slow rise-fast drop contour. This cam is integral with a wheel 14. The wheel 14 meshes with a gear wheel 15 rotated by means of a constant speed motor, whose axis is indicated by the line 16 in FIGURE 3.

A ratchet locking lever 17 is pivoted on the same axle as cam 13 and gear wheel 14, the lever being biased by the pull of a spiral spring 18, to hold a locking pawl 17a on the lever in engagement with the ratchet wheel 2. The lever 17 is disposed behind the plate 1 but the locking pawl 17a extends through the window 5 to engage the ratchet wheel 2.

The opposite end of the lever 17 has a catch 17b which cooperates with the moving lever 7 and limits the amplitude of the lever 7. At the end of the outward movement of the lever 7, it hits the locking lever 17 and biases it to ensure that ratchet wheel 2 is maintained in its exact angular position. Thus the angular positions of all the moving parts of the mechanism associated with the ratchet wheel are held precisely, which is a considerable advantage, especially in programmed time switches.

To permit the use of ratchet wheels having different numbers of teeth, that is to say to provide for one revolution of the ratchet wheel in different numbers of steps, without changing the other parts of the mechanism, it is arranged that the angular separation between the actuating pawl and the locking pawl 17 (for the "drop" position of the cam 13) is equal to 360° divided by the largest common divisor of the numbers referred to (teeth or impulses per revolution of the ratchet wheel), envisaged in practice. Since with 36, 45, and 60 tooth wheels the greatest common divisor is 3, the angular separation in question will be 360°/3=120°.

The operation of the mechanism is as follows:

When the gear 14 and cam 13 rotate under the drive of the motor, the slow rise portion of the cam profile causes the cam follower 7a, which is held in engagement therewith, to turn the lever 7 in a clockwise direction. This movement of the lever 7 progressively urges the shorter arm of the spring 11 towards the longer arm and thereby stores energy in the spring which is subsequently used to bring about rotation, by one tooth, of the ratchet wheel 2.

This movement of the lever 7 causes the actuating pawl 9 to move back at the same time sliding up the tooth of the sationary ratchet wheel 2, until, having passed over the crown of the tooth it drops into the next intertooth gap on the rachet wheel. In this position, the actuating pawl 9 is ready to advance the ratchet wheel through a step of one tooth. Following this "cocking" operation, the cam follower 7a passes over the "fast drop" portion of the cam 13 and falls sharply onto the start of the slow rise portion of the cam, under the biasing action of the accumulator spring 11. This quick anti-clockwise movement of the cam follower 7a and the lever 7 brought about by the release of the came follower and the release of the energy stored in the spring 11 urges the actuating pawl 9 forward and so advances the ratchet wheel 2 by one tooth.

During this movement of the ratchet wheel, locking pawl 17a rides up the face of the tooth immediately in front of it and drops into the next intertooth space. At that instant the longer arm of the lever 7, which carries the cam follower 7a, hits the projection 17b on the lever 17 and urges it in the direction in which the locking pawl 17 engages in the next intertooth gap.

The kinetic energy imparted to the ratchet wheel during its sudden advance by one tooth would normally tend to drive the wheel further, raising both the actuating pawl 9 and the locking pawl 17a, out of their respective tooth gaps. However the combination of the impact of the lever 7 against the lever 17 and the pull-back effort of the spring 18 which both act in opposition to the force tending to raise the pawls is sufficient to prevent further rotation of the ratchet wheel.

It will be evident that the construction of stepping mechanism described above and shown in the accompanying drawings is capable of considerable modification without departing from the scope of the invention, as defined by the claims appended hereto.

I claim:
1. A stepping mechanism comprising,
a cam, having a slow rise-fast drop profile,
drive means for rotating said cam in a continuous manner,
a cam follower movable over the profile of the cam,
a stepping lever reciprocated in response to the movement of said cam follower,
a toothed ratchet wheel,
an actuating pawl in engagement with said ratchet wheel and movable in a rearward direction over a tooth of the ratchet wheel and in a forward direction to drive the ratchet wheel forward,
means biasing the actuating pawl into engagement with said ratchet wheel,
means connecting the actuating pawl to the lever to be reciprocated thereby,
a locking pawl in engagement with the ratchet wheel determining the position of the ratchet wheel between advancing steps, said locking pawl holding the ratchet wheel stationary during the rearward movement of the actuating pawl and preventing overtravel of the ratchet wheel at the end of its forward step,
means constantly biasing the locking pawl into engagement with the ratchet wheel, and
pivoted means supporting the locking pawl and positioned to be impacted by said lever at the terminal portion of the movement of the follower down the fast drop portion of the cam profile to drive the locking pawl into the ratchet wheel at the end of a forward step.

2. A mechanism according to claim 1 wherein said pivoted means comprises a locking lever having two arms, one arm thereof supporting the locking pawl, the other arm thereof lying in the path of movement of the stepping lever.

3. A stepping mechanism comprising,
a cam, having a slow rise-fast drop profile,
drive means for moving said cam in a continuous manner,
a stepping lever having two arms,
a cam follower on one arm of said stepping lever and in engagement with said cam,
an actuating pawl,
means pivotally supporting the actuating pawl on the other arm of said stepping lever,
a toothed ratchet wheel engaged by said actuating pawl, the pawl being movable slowly rearwards to ride over a tooth of the ratchet wheel in response to movement of the stepping lever as the cam follower rides on the slow-rise portion of the cam and being movable quickly forwards to advance the ratchet wheel in response to reverse movement of the stepping lever after the cam follower has passed the highest point of the cam profile,
a locking lever having two arms,
a locking pawl on one arm of said locking lever,
spring means biasing the locking pawl into engagement with the ratchet wheel,
means pivotally supporting said locking lever and locating the other arm thereof in the patch of said reverse movement of the stepping lever to limit said reverse movement and to receive an impact from said stepping lever which assists in preventing overtravel of the ratchet wheel at the end of a step of its movement.

4. A stepping mechanism according to claim 3 wherein the stepping and locking pawl are spaced apart by 120° about the axis of the ratchet wheel.

5. A washing machine timer including a stepping mechanism as claimed in claim 3.

References Cited by the Examiner

UNITED STATES PATENTS

| 1,734,399 | 11/1929 | Primbs | 235—131 |
| 2,917,933 | 12/1959 | Harris | 74—125 |
| 3,071,017 | 1/1963 | Woolley | 74—125 |
| 3,079,071 | 2/1963 | Staneck | 74—125 X |

FOREIGN PATENTS

| 622,275 | 6/1961 | Canada. |

MILTON KAUFMAN, *Primary Examiner.*

BROUGHTON G. DURHAM, *Examiner.*